United States Patent [19]

Lim

[11] Patent Number: 5,765,036
[45] Date of Patent: Jun. 9, 1998

[54] SHARED MEMORY DEVICE WITH ARBITRATION TO ALLOW UNINTERRUPTED ACCESS TO MEMORY

[76] Inventor: Whai Lim, 1120 Galloway St., Pacific Palisades, Calif. 90272

[21] Appl. No.: 813,109

[22] Filed: Mar. 7, 1997

Related U.S. Application Data

[63] Continuation of Ser. No. 319,231, Oct. 6, 1994, abandoned.

[51] Int. Cl.$^6$ ............................ G06F 12/00; G06F 13/00
[52] U.S. Cl. .................... 395/474; 364/DIG. 1; 364/246.1; 395/478; 395/481; 395/485
[58] Field of Search .................. 364/DIG. 1, 246.1; 395/474, 478, 481, 485

[56] References Cited

U.S. PATENT DOCUMENTS

| | | | |
|---|---|---|---|
| 4,803,618 | 2/1989 | Ita et al. | 395/474 |
| 5,043,874 | 8/1991 | Gagliardo et al. | 395/478 |
| 5,043,886 | 8/1991 | Witek et al. | 395/470 |
| 5,201,040 | 4/1993 | Wada et al. | 395/474 |
| 5,202,973 | 4/1993 | Ramanujan et al. | 395/474 |
| 5,263,150 | 11/1993 | Chai-Fan | 395/550 |
| 5,293,602 | 3/1994 | Fukagawa et al. | 395/474 |
| 5,410,654 | 4/1995 | Foster et al. | 395/474 |
| 5,412,656 | 5/1995 | Brand et al. | 370/61 |

Primary Examiner—Tod R. Swann
Assistant Examiner—Tuan V. Thai
Attorney, Agent, or Firm—Gregory M. Howison

[57] ABSTRACT

A shared memory system (10) is provided which interfaces with a shared memory bus (14). The shared memory bus (14) interfaces with a plurality of peripherals (12) through memory interfaces (16). Each of the memory interfaces (16) is operable to receive addresses from the associated one of the peripheral units (12) and communicate with the shared memory system (10) to process the addresses and subsequent data transfers in an ordered manner. The shared memory system (10) has associated therewith an arbitration logic circuit (78) that is operable to service bus requests from each of the memory interfaces (16). When a bus request is received, the requesting one of the memory interfaces (16) is allowed to access a single byte of data, after which it relinquishes the bus to another one of the memory interfaces (16). The previous requesting one of the buses that performed the one byte data transfer operation is then lowered in its priority such that all the requesting ones of the memory interfaces (16) are allowed to transfer at least one byte of data. This results in a byte-by-byte transfer of data without allowing any one of the memory interfaces (16) to seize and hold the bus for multiple data transfers in a sequential manner. In another mode, each of the memory interfaces (16) is allowed to seize the bus to continuously transfer data with a priority system implemented to allow a higher priority one to seize the bus away from the lower priority one.

3 Claims, 8 Drawing Sheets

SHARED MEMORY DEVICE WITH ARBITRATION TO ALLOW UNINTERRUPTED ACCESS TO MEMORY

This application is a continuation of application Ser. No. 08/319,231, filed Oct. 6, 1994 now abandoned.

TECHNICAL FIELD OF THE INVENTION

The present invention pertains in general to computer systems, and more particularly to a computer system having a central shared memory with multiple peripheral systems that can directly access the shared memory without conflicting with each other.

BACKGROUND OF THE INVENTION

In large integrated computer networks, large storage systems are typically disposed in a server-based system with multiple peripheral systems allowed to operate independently and access the server main memory. One typical way for integrating such a network is that utilized in Local Area Networks (LANs). In these type of networks, a single broadband communication bus or media is provided through which all signals are passed. These LANs provide some type of protocol to prevent bus conflicts. In this manner, they provide an orderly method to allow the peripheral systems to "seize" the bus and access the server main memory. However, during the time that one of the peripheral systems has seized the bus, the other peripheral systems are denied access to the server main memory.

In the early days of computers, this was a significant problem in computer centers in that a computer operator determined which program was loaded on the computer, which in turn determined how the computer resources were utilized. However, the computer operator would assign priority to certain programs such as those from a well-known professor in a university system. In such an environment, it was quite common for priority to be assigned such that the computer could be tied up for an entire evening working on a problem for an individual with such a high priority. Students in the university-based system, of course, had the lowest priority and, therefore, their programs were run only when the system resources were available. The problem with this type of system was that an extremely small program that took virtually no time to run was required to sit on the shelf for anywhere from five to twenty hours waiting for the larger, higher priority program to run. Although it would have been desirable to have the system operator instruct it to interrupt the higher priority program for a relatively short time to run a number of the fairly short programs, this was not an available option. Even if this interruption may have extended the higher priority program for a fairly short time, it would clearly provide a significantly higher level of service to the low priority small program users.

Present networks are seldom comprised of a single LAN system due to the fact that these networks are now distributed. For example, a single system at a given site utilizing a local network that operates over, for example, an Ethernet® cable, would have a relatively high data transfer rate on the local cable. The Ethernet® cables in those systems provide a means to access remote sites via the telephone lines or other communication links. However, these communication links tend to have significantly slower access time. Even though they can be routed through a relatively high speed Ethernet® bus, they still must access and transmit instructions through the lower speed communication link. With the advent of multimedia, the need for much larger memories that operate in a shared memory environment has increased. In the multimedia world, the primary purpose of the system is for data exchange. As such, the rate of data transfer from the server memory to multiple systems is important. However, regardless of the type of memory system or the type of data transfer performed, the system still must transfer the data stored in the server memory in a serial manner; that is, only one word of data can be accessed and transferred out of the memory (or written thereto) on any given instruction cycle associated with the memory. When multiple systems are attempting to access the given server memory, it is necessary to control the access to the server memory by the peripheral system in an orderly manner to ensure all peripheral systems are adequately served.

In typical systems that serve various communication links to allow those communication links to access the server memory, separate coprocessors are typically provided to handle the communication link.

This will therefor requires the server processor to control access to the server main memory. By requiring the server processor to serve access control limits the amount of data that can be transferred between the server and the communication coprocessor, thus to the peripheral.

SUMMARY OF THE INVENTION

The present invention, disclosed and claimed herein, comprises a shared memory system that includes a centrally located memory. The shared memory has a plurality of storage locations, each for storing data of a finite data size as a block of data. The block of data is accessible by an address associated with the storage location of the block of data for storage of data therein or retrieval of data therefrom. The centrally located memory is controlled by a memory access control device. A plurality of peripheral devices are disposed remote to the shared memory system, each operable to access the centrally located memory and generate addresses for transmittal thereto to address a desired memory location in the central locating memory system. The peripheral device is then allowed to transfer data thereto or retrieve data therefrom. A memory interface device is disposed between each of the peripheral devices and the centrally located memory system and is operable to control the transmittal of addresses from the associated peripheral device to the centrally located memory and transfer of data therebetween. The memory interface device has a unique identification (ID) which is transmitted to the centrally located memory. Associated with the centrally located memory is an arbitration device that is operable to determine which of the peripheral devices is allowed to access the centrally located memory. The arbitration device operates in a block-by-block basis to allow each peripheral unit to only access the centrally located memory for a block of data before relinquishing access, wherein all requesting ones of the peripheral devices will have access to at least one block of data prior to any of the peripheral devices having access to the next block of data requested thereby.

In an alternate embodiment of the present invention, each block of data comprises a byte of data. Further, each memory interface device is given a priority based upon its unique ID. The arbitration device operates in a second mode to allow the highest priority one of the requesting peripheral devices to seize the bus away from any of the other peripheral devices to access all of the data requested thereby.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
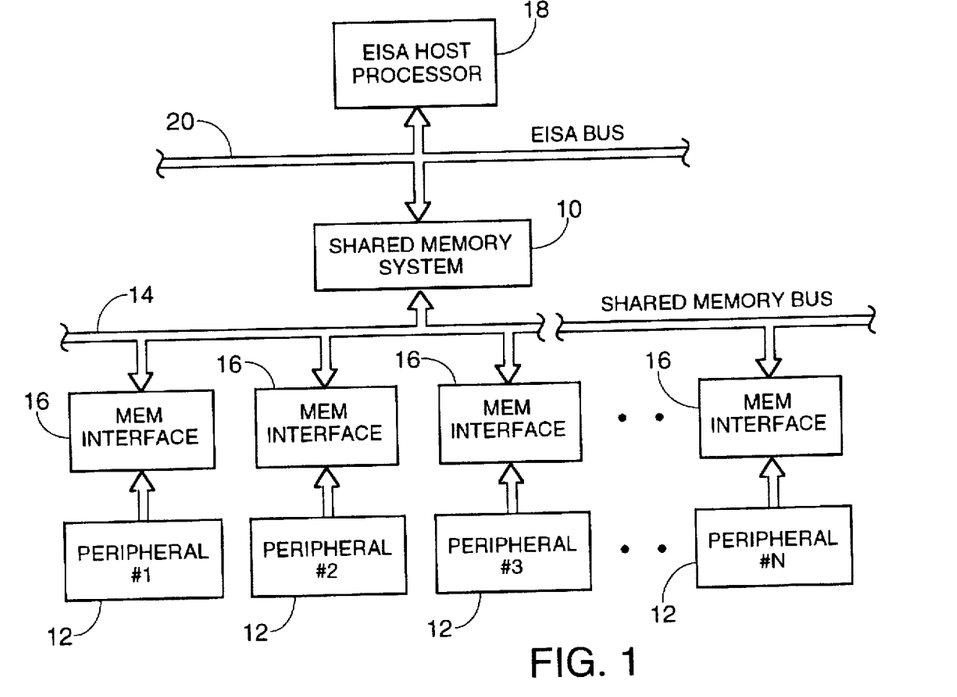
FIG. 1 illustrates an overall block diagram of the system.

Referring now to FIG. 1, there is illustrated an overall block diagram of the system of the present invention. At the heart of the system is a shared memory system 10 which, as will be described hereinbelow, provides a global memory that is accessible by a plurality of peripheral systems 12. The shared memory system 10, as will be described in more detail hereinbelow, is operable to serve each of the peripheral systems by receiving requests for data transfer, i.e., reading or writing of data to the global memory in the shared memory system 10, and arbitrating the service such that all peripheral units 12 are served in an even manner. Also, as will be described hereinbelow, various priorities are given to the peripheral units 12. The shared memory system 10 is operable to interface with each of the peripheral memories 12 through a shared memory bus 14. Each of the shared memory buses 14 are connected to the various peripheral memories 12 through an interface 16. In addition, in the preferred embodiment a host processor 18 is provided. This host processor 18 is given the highest priority in the system, and is operable to interface with the shared memory system 10 via an Extended Industry Standard Architecture (EISA) bus 20. The EISA host processor 18 functions similar to the peripheral units 12 and, in fact, is logically a peripheral system to the shared memory system 10. The host system 18 does, however, have additional functions with respect to initializing the operation, etc.

Figure 2:
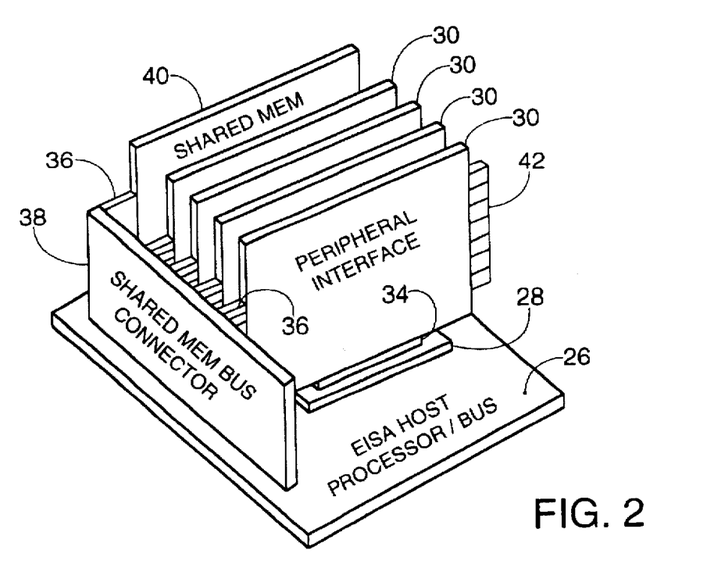
FIG. 2 illustrates a perspective view of the physical configuration of the system.

Referring now to FIG. 2, there is illustrated a perspective view of the physical configuration for the system of FIG. 1. An EISA host processor/bus board 26 is provided which is operable to contain the host processor 18 and the EISA bus 20. A plurality of EISA bus connectors 28 are provided, into which a plurality of peripheral interface boards 30 are inserted. Each of the peripheral interface boards is provided with an EISA interface connector 34, which is disposed on the lower edge of the peripheral interface board 30 and inserted into EISA bus connector 28. However, this could be any type of computer bus architecture, such as Industry Standard Architecture (ISA),Peripheral Component Interconnect (PCI) etc. A shared memory bus connector 36 is disposed on one end of the peripheral interface boards 30 and operable to be inserted into a common shared memory bus connector 38. In addition to the peripheral interface boards 30, a shared memory board 40 is disposed in one of the EISA memory bus connectors 38 on the EISA host processor/bus board 26. The shared memory 40 has a shared memory bus connector 36 associated therewith which is also operable to be interfaced with the common shared memory bus connector 38. Additionally, each of the peripheral interface boards 30 has associated therewith a peripheral interface connector 42. The peripheral interface connector 42 is operable to interface with the peripheral device 12.

The peripheral devices 12 can be of many different types. One example is an RS232 interface, which allows any type of peripheral device 12 that utilizes an RS232 communication protocol to access the shared memory system 10. When the peripheral device 12 generates an address to access the shared memory, the peripheral interface board 30 is operable to service this request and generate the instructions necessary to the shared memory board 40 in order to access the memory disposed thereon, this also including any memory mapping function that may be required. It is noted that each of the peripheral interfaces 30 has a unique ID on the shared memory bus. The unique ID determines both priority and the ID of the board and, hence, it determines how a shared memory system 10 services memory access requests from the peripheral interface boards 30. As will be described hereinbelow, each of the peripheral interface boards 30 is operable to buffer memory requests from the peripheral device 12 until they are served by the shared memory system 10.

Figure 3A:
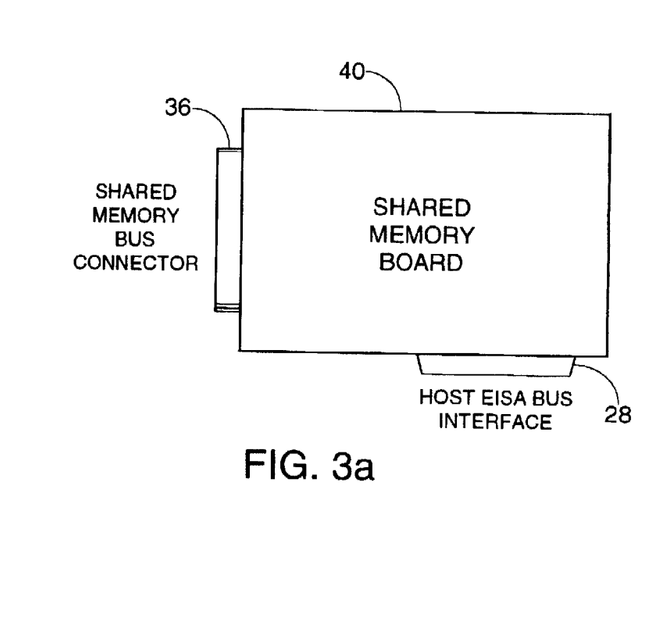
FIGS. 3a and 3b illustrate views of the shared memory board and peripheral interface board, respectively.
Figure 3B:
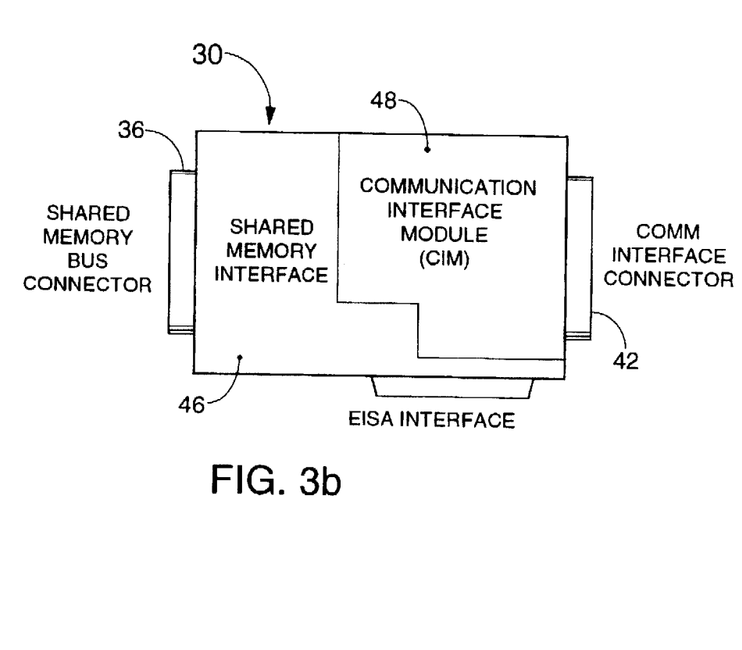

Referring now to FIGS. 3a and 3b, there are illustrated general layouts for boards themselves. In FIG. 3a, the shared memory board 40 is illustrated depicting on one edge thereof the male shared memory bus connector 36 and on the lower edge thereof, the host EISA bus interface connector 28. In FIG. 3b, the peripheral interface board 30 is illustrated. The peripheral interface board 30 is comprised of two sections, a shared memory interface section 46 and a Communication Interface Module (CIM) 48. The shared memory interface portion 46 is operable to interface with the shared memory bus 14 and the communication interface module 48. The communication interface module 48 determines the nature of the peripheral interface board 30. For example, if the peripheral interface board 30 of FIG. 3b were associated with an RS232 peripheral device 12, the communication interface module 48 would be operable to convert between a parallel data system and a serial data system, generating the various transmission signals necessary to handle the protocol associated with an RS232 interface. This allows data to be transmitted in an RS232 data format. Additionally, the CIM 48 is operable to receive data in RS232 format and convert it to a parallel word for transmission to the shared memory interface portion 46.

The shared memory interface portion 46 contains various processors for allowing the shared memory interface portion 46 to interface with the shared memory system 10 via the shared memory bus 14. If the CIM 48 were associated with an Integrated Services Digital Network (ISDN) function, for example, the CIM 48 would also provide the interface between a parallel bus an ISDN format. The functionality of a CIM 48 is quite similar to that associated with peripheral boards in an ISA bus architecture, i.e., it allows for conversion between a parallel bus and the communication identity.

In the present embodiment, the EISA architecture utilizes a 32-bit bus structure.

Figure 4:
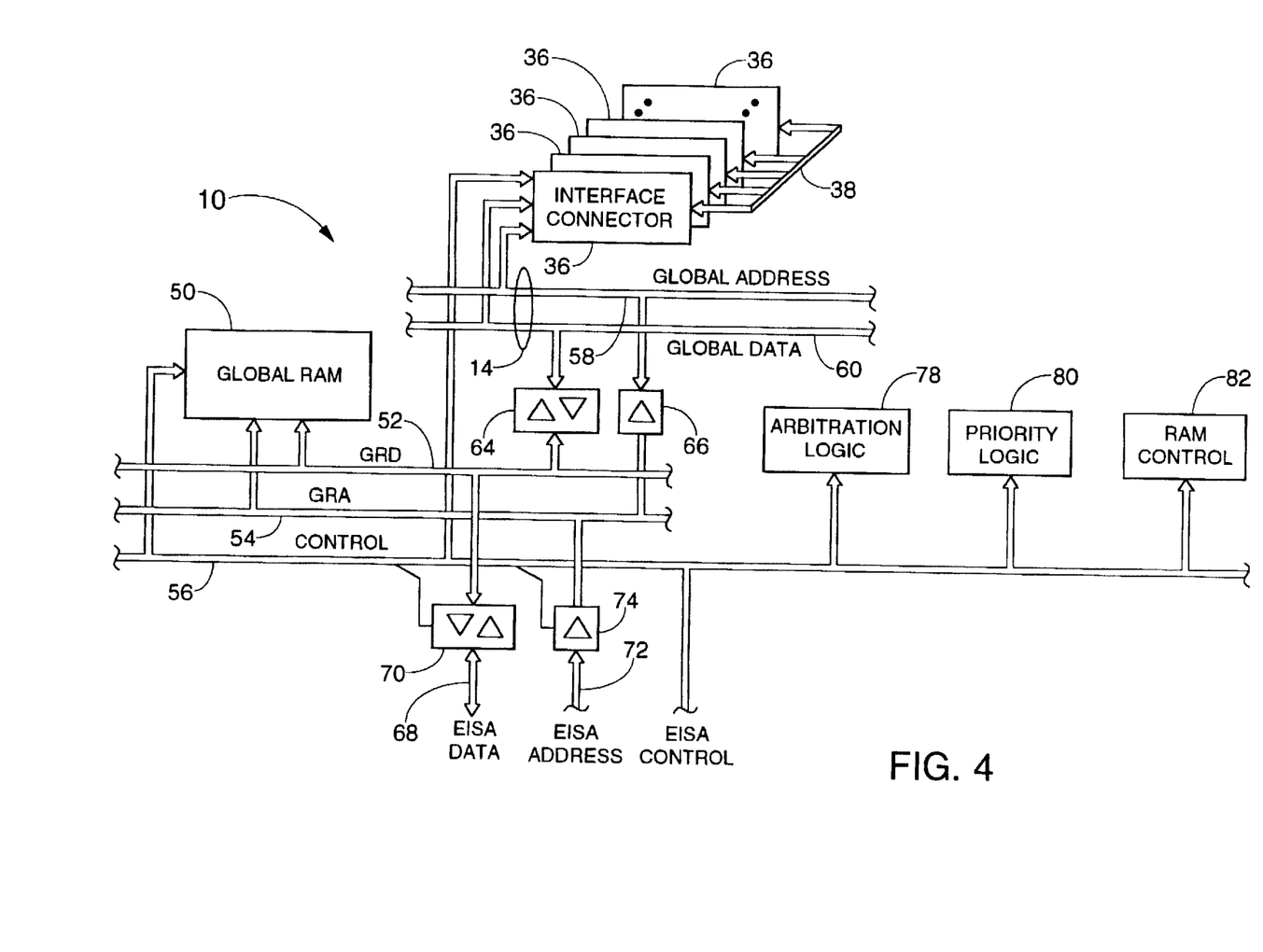
FIG. 4 illustrates a diagram of the shared memory system.

Referring now to FIG. 4, there is illustrated a block diagram of the shared memory system 10. The shared memory system 10 has associated therewith a number of buses. At the heart of the shared memory system 10 is a global random access memory (RAM) 50. The global RAM 50 has an address input, a data input and a control input for receiving the Read/Write signal and various control signals for the Read operation such as the Column Address Strobe (CAS) and the Row Address Strobe (RAS). These are conventional signals. The global RAM 50 occupies its own memory space such that when it receives an address, this address will define one of the memory locations of the global RAM 50. This is conventional. The data input of the global RAM 50 is interfaced with a global RAM data (GRD) bus 52, and the address input of the global RAM 50 is interfaced with a global RAM address (GRA) address bus 54. The control input of the global RAM 50 is interfaced with a control bus 56. Data is not transferred directly from the GRD bus 52 nor addresses transferred directly from the GRA bus 54 to the connector 36 associated with the shared memory board 40 which is then relayed to the other connectors 36 associated with the peripheral interface boards 30 via the connector 38. The connector 36 provides for control inputs, address inputs and data inputs. The address inputs and data inputs are interfaced with the shared memory bus 14. The shared memory bus 14 is comprised of a global address bus 58 and a global data bus 60. The global address bus 60 is interfaced through a transceiver 64 to the GRD bus 52. The transceiver 64 allowing for the transfer of data from the global data bus 60 to the GRD bus 52 and also from the GRD bus 52 to the global data bus 60. The global address bus 60 is connected through a buffer 66 to the GRA bus 54 to allow the peripheral systems 12 to address the global RAM 50. As will be described hereinbelow, the address space in the peripheral system is mapped into the memory space of the global RAM 50, such that the global RAM 50 merely becomes an extension of the memory system at the peripheral system 12.

The EISA data is provided on EISA data bus 68, which EISA data bus 68 is interfaced through a transceiver 70 to the GRD bus 52. The EISA address is input to an EISA address bus 72. The EISA address is input to an EISA address bus 72 and then input to GRA bus 54 through a buffer 74. The transceiver 70 and buffer 74, are a "gated devices", as are the transceiver 64 and buffer 66. This allows the shared memory system 10 to prevent bus contention and service or receive addresses from only the peripheral units 12 or the host processor 18. However, it should be understood that the host processor 18 could merely have been defined as a peripheral device and interfaced with a peripheral interface board 30 to the shared memory bus 14. Each of the peripheral systems 12 and EISA host processor 18 are interfaced with the control bus 56 to allow control signals to be passed therebetween.

The shared memory system 10 is controlled primarily by logic, with the processor function being distributed to the memory interface 16. The shared memory system 10 provides the operation of arbitration and priority determination. In the arbitration function, the shared memory system 10 determines via various bus signals generated by the shared memory interfaces 16 to determine how to service these requests and which one is serviced at a given time. Additionally, each of the peripheral systems is assigned a priority such that the arbitration function is based upon priority. This will be described in much more detail hereinbelow. The arbitration function is provided by an arbitration logic block 78 with the priority provided by a priority logic block 80. The various control functions for the global RAM 50 are provided by a RAM control block 82. The logic blocks 78 and 80 are provided by programmable logic devices (PLD). This function is provided by an integrated circuit such as the Intel N85C-220-80, a conventional PLD.

Figures 5, 5A:
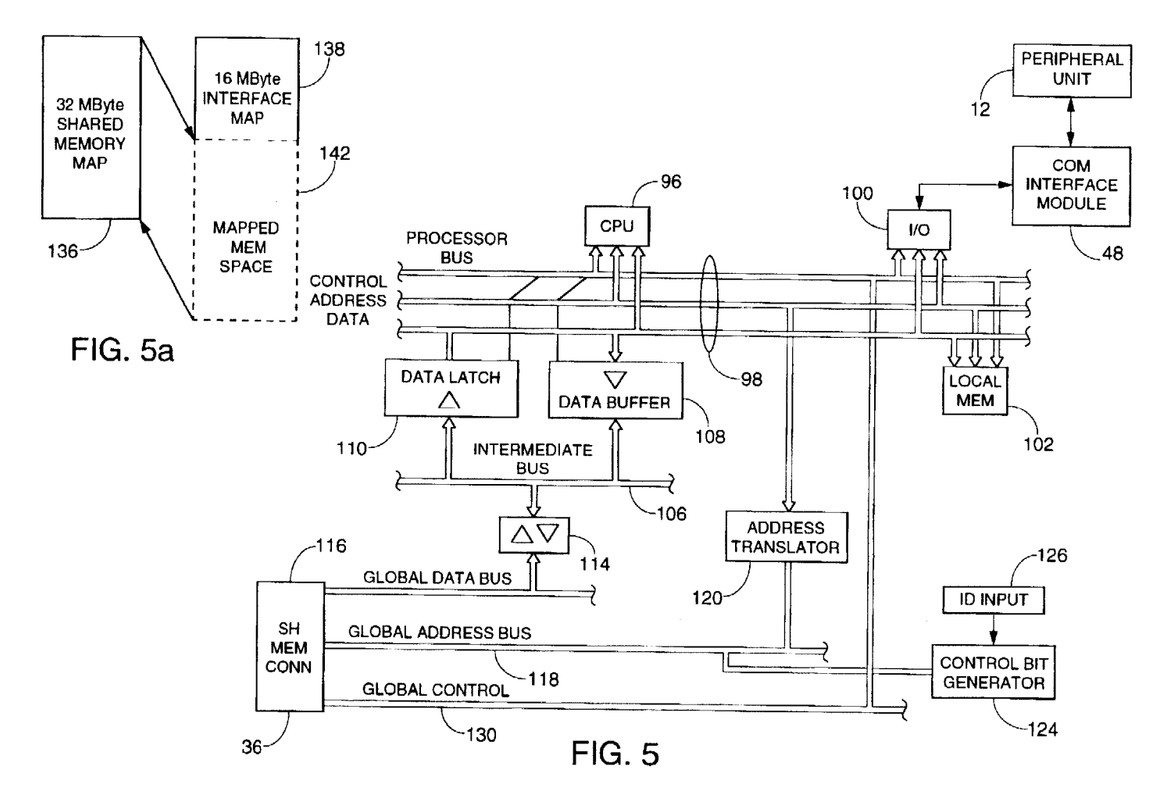
FIG. 5 illustrates a diagram of the shared memory interface.
FIG. 5a illustrates a memory map for the system of the present invention.

Referring now to FIG. 5, there is illustrated a block diagram of the peripheral interface board 30. The peripheral interface board 30, as described above, is operable to perform a slave function between the peripheral device 12 and shared memory system 10. The peripheral interface board has at the heart thereof a central processing unit (CPU) 96. In actuality, the CPU 96 is based on a 32-bit Extended Industry Standard Architecture (EISA) bus architecture and utilizes three Motorola INP68302s. These are conventional chips and have onboard a 16 MHz, 6800 processor core, which operates on a 6800 32-bit bus. The 32-bit bus has associated therewith an interrupt controller, a general purpose DMA control block and timers. The 32-bit bus is operable to interface with off-chip memory and other control systems, providing both data and address in addition to control functions. The internal 6800 32-bit bus interfaces through various Direct Memory Access (DMA) channels with a Reduced Instruction Set Computer (RISC) processor bus. Attached to the RISC processor bus is a 16 MHz RISC communication processor. This processor is operable to interface with such things as ISDN support circuits, etc. Again, this is a conventional design and, in general, the three processors that make up the CPU 96 are divided up such that one operates as a master and the other two are slaves to distribute various processing functions. However, a single CPU could be utilized.

The CPU 96 interfaces with an onboard processor bus 98, which processor bus is comprised of an address, a data and a control bus. The processor bus 98 is interfaced with an input/output circuit 100, which is generally realized with a peripheral input/output device manufactured by Intel, Part No. 82C55A. This provides for a local input/output function that allows the processor bus 98 to communicate with the communication interface module 48, communication interface module 48 then operable to interface through the connector 42 with the peripheral unit 12. Local memory 102 is also provided, which local memory occupies an address space on the processor bus 98. As will be described hereinbelow, the address space associated with local memory 102 also occupies the address space of the peripheral unit 12, i.e., directly mapped thereto. In order for the processor bus 98 to interface with the shared memory connector 36 and the shared memory system 10, the data portion of the processor bus 98 is interfaced with an intermediate data bus 106 via data buffers 108 for transferring data from the data portion of the processor bus 98 to the intermediate data bus 106, and a data latch 110 for transferring data from the intermediate data bus 106 to the data portion of the processor bus 98. A bi-directional transceiver 114 is provided for connecting the intermediate data bus 106 with a global data bus 116 when the global data bus 116 is interfaced with the shared memory connector 36. Similarly, a global address bus 118 is interfaced with the shared memory connector 36 for receiving addresses from the address portion of the processor bus 98. However, as will be described in more detail hereinbelow, the address on the address portion of the process memory of the processor bus 98 is mapped or translated via an address translator block 120 to basically map one Megabyte portions of the address space to the address space in the shared memory system.

This address translation is facilitated via a static random access memory (SRAM) of the type T6TC6688J. This is a 32K memory for translating the eight megabyte portions to the desired portions of the shared memory address space.

In addition to translating the address that is input from the peripheral unit 12 to the peripheral interface board 30, the address that is generated from the processor bus 98 and relayed to the global address bus 118 also has control information associated therewith. There are a number of higher order address bits that are not required for the available memory space in the shared memory system 10. These address bits are used as control bits and are generated by a control bit generator 124. Each unit has an ID that is input via a DIP switch 126 which allows the user to set the ID for a given board. Therefore, whenever an address is sent to the shared memory system 10, it not only contains an address as translated into the memory space of the shared memory system 10 but also contains the control bit. Various other controls are input along a global control bus 130 that is connected to control portion of the processor bus 98 and also to the shared memory connector 36.

Referring now to FIG. 5a, there is illustrated a diagrammatic view of the address space of the shared memory system and the peripheral interface board 30. A 32 Megabyte shared memory map 136 is provided, representing the memory map of the shared memory system 10, although this could be any size. In general, in the memory space associated with the shared memory system 10, the first location in the memory map 136 is represented by the "0" location. The highest order bit would be the Hex value for 32 Megabytes. By comparison, the peripheral interface board 30 has associated therewith a 16 Megabyte map 138. This therefore allows up to 16 Megabytes of memory to be associated with the peripheral interface board 30. This local memory provides the ability for the peripheral interface board 30 to carry out multiple processing functions at the peripheral interface board level. These operations will be described in some detail hereinbelow. However, it is important that when data is being transferred to the peripheral interface board that there is no conflict between the two memory spaces. Therefore, data that is being transmitted to the shared memory system 10 must have a different address above the physical eight Megabyte memory space. This is facilitated by defining the address space for the shared memory system 10 relative to the input to the peripheral interface board from the peripheral unit 12 as being at a higher address. Therefore, the "0" location in the address space of the map 136 appears to be in a different portion of the memory space of the peripheral interface board 30 above the eight Megabyte memory space. This is represented by a virtual memory space 142. When an address exists in this space, it is recognized and transmitted to the shared memory system 10 after translation thereof to the address space of the shared memory system 10. This allows an address to be generated at the peripheral unit 12 and then transmitted directly to the shared memory system 10.

Figure 6:
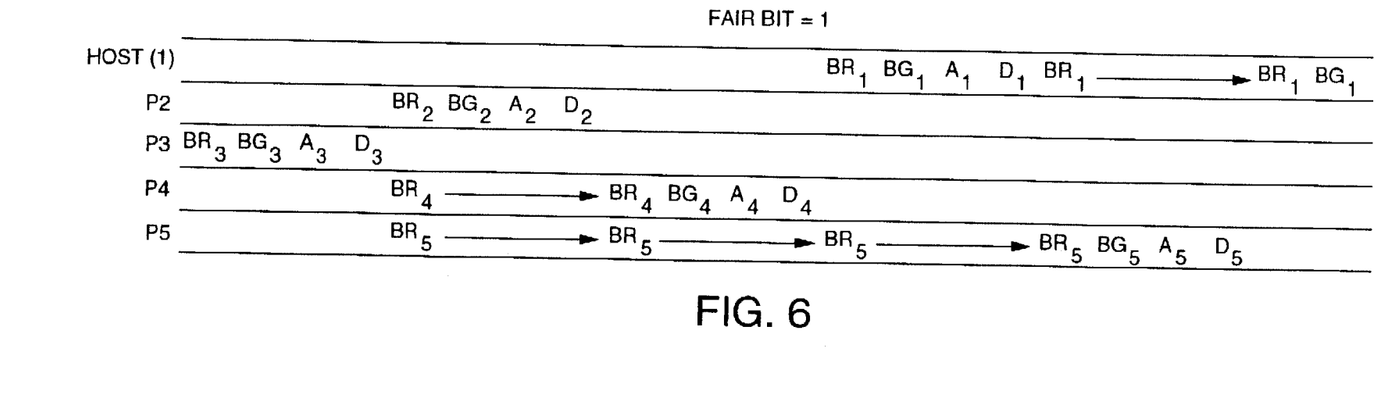
FIGS. 6 and 7 illustrate a timing diagram for the memory access.
Figure 7:
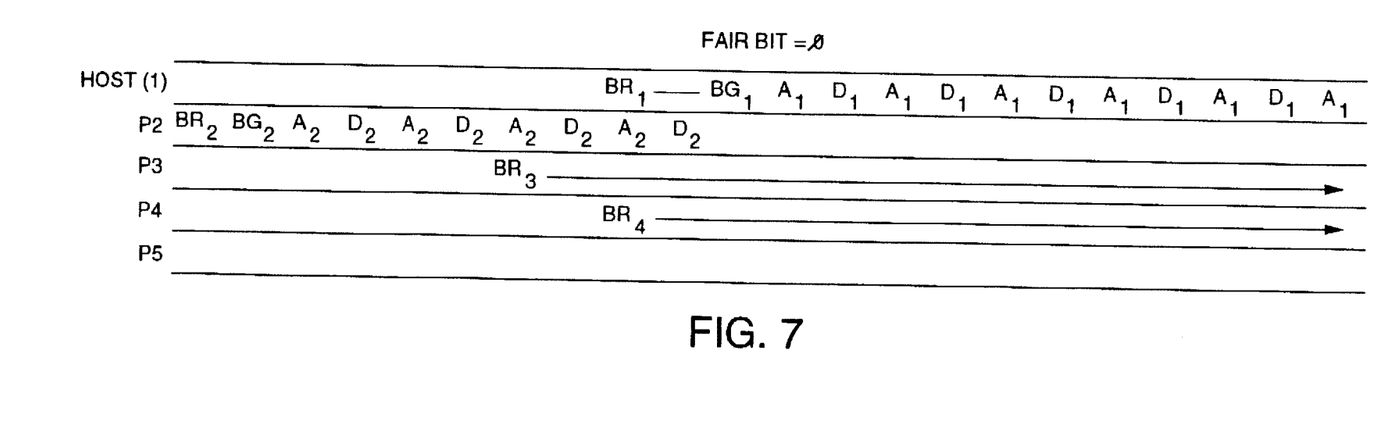

Referring now to FIGS. 6 and 7, there are illustrated timing diagrams for the arbitration sequence for two modes of operation, a byte-by-byte arbitration mode and a priority based bus seizing mode. The two modes are facilitated by a control bit referred to as a "Fair" Bit that, when set to "1" causes the mode to operate in a byte-to-byte mode and when set to "0", forces the system to operate in the priority based bus seizing mode. FIG. 6 illustrates the byte-to-byte mode and FIG. 7 illustrates the priority based bus seizing mode.

With further reference to FIG. 6, there are illustrated timing diagrams for five bus accessing systems, the host system and four peripheral units 12. As described above, the host processor 18 essentially operates as a peripheral unit with the exception that it is given the highest priority, as will be described hereinbelow. Whenever memory is accessed, it typically requires four memory access cycles. The first operation is a bus request that is sent from the peripheral interface board to the shared memory system 10. When this is processed, a bus grant signal is then sent back from a shared memory system 10 to the peripheral interface board 30. On the next cycle, an address is transmitted to the peripheral unit 12, followed by data in the next cycle. This is then repeated for the next byte of information that is transmitted. As such, four cycles in the timing diagram of FIG. 6 are required for each byte of data that is transmitted. However, the arbitration logic 78 operates to provide a pseudo-concurrence of data transfer. This pseudo-concurrence is provided in that each peripheral board is allowed to seize the bus for the purpose of transferring one byte of data. Therefore, the bus is relinquished to another peripheral interface board 30 to allow it to transfer a byte of information and so on. As such, this provides a relatively fair use for a fully loaded system such that a single peripheral interface board 30 cannot seize and occupy the bus. In applications such as a massive transfer of video or image information, it is necessary to allow all peripheral systems to have as much access to the data as possible. This is true especially for such systems as interactive applications. For example, when two systems are accessing the same database such that two peripheral systems interact with each other, it is important that one system be able to write to a memory location in one cycle, i.e., four uninterruptable memory access cycles required for the memory system, and then another peripheral system is able to access the data on the next data transfer cycle. This provides for the maximum flexibility in an interactive system utilizing a shared memory. If, on the other hand, one system were allowed to seize the bus, it would virtually isolate another peripheral system from the memory while it has seized control of it. This, therefore, detracts from the interactive nature of any type of shared memory application.

In the timing diagram illustrated in FIG. 6, the peripheral unit P3 initially generates a bus request, followed by receipt of the bus grant and then transmission of address and data. Upon the next cycle, three bus requests are then received, one from peripheral unit P2, one from peripheral unit P4 and one from peripheral unit P5. However, due to the priority nature of this system, the bus is released to peripheral unit P2 for transfer of data therebetween. However, the bus requests for P4 and P5 remain and upon the next data transfer cycle, the bus is relinquished to P4 and, at the end of this cycle, a decision is made as to the next peripheral unit to receive it. At the end of the data transfer cycle for P4, the host generates a bus request. Although the system is operable to grant the request to the first requesting peripheral unit, the host has maximum priority and bus access is granted to the host. However, at the end of the transfer cycle of the bus to the host, the host is forced to release the bus and it is given to peripheral unit P5. However, the host still desires to transfer information and the bus request is maintained at the end of the data transfer information by P5, the bus is released back to the host. It is important to note that if all peripheral units including the host generate a bus request constantly, the system would divide the operation up such that all 5 peripheral units had the same amount of access to the bus in an alternating timeslot method. This provides the maximum throughput efficiency for all systems.

With further reference to FIG. 7, there is illustrated the timing diagram for a system wherein a priority bus seizure mode is facilitated. In this mode, the arbitration logic 78 determines when a bus request is received from one of the peripheral units or the host and then allows the highest priority one thereof to seize the shared memory bus. If a bus request is received from a higher priority system, the lower priority system is forced to relinquish the bus and give it to the highest priority system. In FIG. 7, the bus request is initially received from a peripheral unit P2. In the initial bus request, two cycles are required to process the bus request and then send back a bus grant. Thereafter, the system enters a different mode that does not require further bus requests and bus grants to be processed for P2. As long as a higher priority system does not request the bus, the transfer operation requires only two cycles, comprised of generating an address followed by transfer of data. This continues until a bus request is received from the host, which then transmits a bus grant after the last data transfer operation following the bus request by the host. Once the bus grant has been transmitted, the system falls into the mode wherein two cycles are required, comprised of two sequential transmissions of address and data. It is noted that a bus request is also transmitted by P3 and P4 but are never serviced because the bus request for P2 and the host was maintained, with the host overriding P2. Although for a given peripheral unit, this results in a much faster data transfer operation, a 2× increase, this does not provide for fair use over all peripheral units, wherein the lowest priority one can be completely locked out of access to the shared memory system 10.

In the priority operation, the reason for allowing a given peripheral unit to have full access to the bus is such that the peripheral device itself can service the type of media that is associated with the peripheral device 12. For example, if the peripheral device 12 were associated with a video application, it would be desirable for the data transfer to occur uninterrupted. Therefore, the shared memory interface 46 is operable to generate the Fair bit. By allowing the shared memory interface 46 associated with the peripheral device 12 to generate the Fair bit, it can determine whether its application needs to "seize" the bus. Therefore, all peripheral units could generate the Fair bit as a "0" and desire to "seize" the bus. In this situation, of course, the priority would determine which peripheral unit is allowed to "seize" the bus. Normally, however, the Fair bit will be set to "1", allowing a byte-by-byte transfer.

Figure 8:
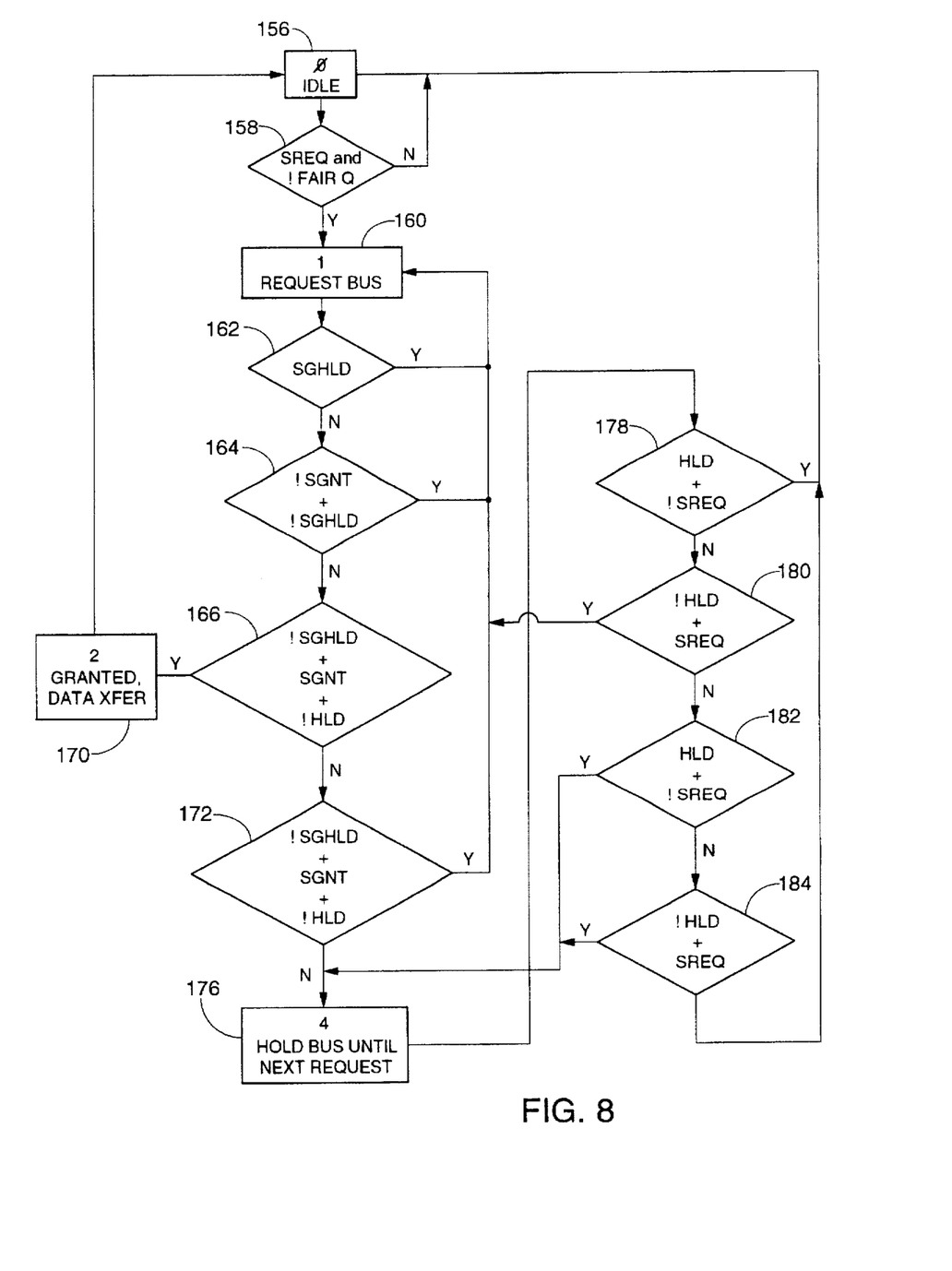
FIG. 8 illustrates a flowchart for the operation of the system.

Referring now to FIG. 8, there is illustrated a flowchart depicting the state diagram for the transfer operation. The state diagram is initiated at a block 156, which is the "0" state indicating the idle state. The state diagram then flows to a decision block 158 to determine if a slave request signal for a bus (SREQ) under the condition wherein the FAIR bit is set equal to "1" (!FAIRQ). For the purposes of this flowchart, the following table lists the various commands:

TABLE I

| SREQ | Slave Request |
| !FAIRQ | FAIR Bit Set = 1 |
| SGHLD | Slave Grant Hold |
| SGNT | Slave Grant |
| HLD | Hold Command Generated by Shared Memory |

In the mode depicted in the decision block 158, SREQ is only serviced when the fair bit is set equal to one. Until this occurs, the program flows along the "N" path back to the state block 156. When both the slave request has been received and the fair bit is set equal to zero, the state diagram flows to a function block 160, which represents the state one of the state diagram. This is the state wherein the bus is being requested. The state diagram then flows to a decision block 162 to determine if SGHLD signal is generated, indicating a hold operation. If this occurs, the state diagram will flow back in a loop to the decision block 160 until the SGHLD signal is removed. The state diagram will then flow back along the "N" path to a decision block 164 to determine if the !SGNT and !SGHLD are present. This indicates that both the bus grant for the slave has been generated and the bus grant hold signal have been removed. Until this occurs, the program will flow along the "Y" path back to the state block 160. When the SGHLD signal is removed and the SGNT signal is generated, the program flows along the "N" path to a decision block 166. This indicates that there is no hold of the grant and that the grant has been sent from the shared memory system 10 to the peripheral interface board 30. The decision block 166 determines if the SGHLD signal is removed (!SGHLD), whether the SGNT signal has been generated and whether the HLD signal has not been generated (!HLD). If the SGHLD signal is not generated, indicating there is no hold on the grant, the SGNT signal is sent, indicating a bus grant condition, and the HLD signal is not present, indicating there is no hold on the system, the state diagram would flow along the "Y" path to a state block 170 indicating the state to wherein bus access is granted and data transfer can occur. The state diagram would then flow back to the idle state in block 156 and continue along this loop as long as the conditions of decision block 166 are generated. When either the bus grant has been removed, a bus grant hold has been generated or a hold has been generated, the program will flow along an "N" path from the decision block 166 to a decision block 172. The decision block 172 determines if the conditions of decision block 166 remain the same or if the signals have changed. If the state diagram flows from the decision block 166 to the decision block 172 and conditions change, the state diagram will flow along the "Y" path from decision block 172 back to the state one block 160. However, if they remain the same, the state diagram will flow to the next state, state four, as indicated by a block 176, indicating the condition wherein the bus will be held until the next request has been received. The state diagram will then flow to a decision block 178 to determine if the HLD signal is present and the bus request is not present. If so, the program will flow along a "Y" path back to the idle state block 156. If either the HLD signal has been removed or the bus request has been received, the state diagram will flow along the "N" path to a decision block 180 to determine if the HLD signal has been removed and the bus request has been generated. If so, the state diagram will flow back to the state block 160 to request the bus. This is the condition wherein the system was held for some other reason, there being numerous reasons for holding the bus and thus release the bus to service the bus request from the requesting one of the peripheral units 12. If either the HLD signal has not been removed or the bus request is not present, the state diagram will flow along the "N" path to a decision block 182 to determine if the ELD signal is still generated and the bus request is not present. If not, this generates a Hold state and a state diagram will flow along a "Y" path to the state block 176 to continue the bus hold operation. If the HLD operation is still present or the bus request has been generated, the state diagram will flow along the "N" path to a decision block 184 to determine if both the hold operation is present and the bus request is present. If so, the program will flow along the "Y" path to the state block 176. However, if either the HLD signal is not generated or the bus request is not generated, the state diagram will flow back to the idle block 156.

It should be noted that at decision block 158, a priority decision is made. The bus request will be serviced based upon the priority. Once data transfer has occurred, the priority of that peripheral unit will fall to the lowest priority and the arbitration logic 78 will then service the next received bus request in the first in, first out mode, placing the previous requesting peripheral unit at the bottom of the que.

Figure 9:
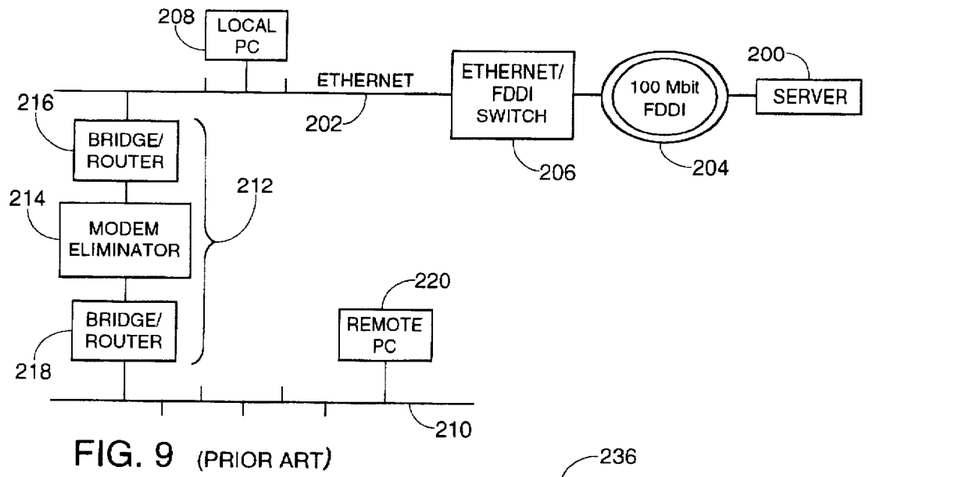
FIG. 9 illustrates a prior art configuration for the overall system.

Referring now to FIG. 9, there is illustrated a block diagram of the prior art system. In the prior art system, there is illustrated a server 200, which is operable to contain the main server memory. The server 200 is interfaced with an Ethernet® cable 202 via an FDDI system 204 which is a high speed communication link operating at approximately 100 Megabytes. This will therefore require an Ethernet®/FDDI switch 206 to interface between the Ethernet® cable 202 and the FDDI network 204. A local PC 208 is a single peripheral unit that interfaces with the Ethernet® cable 202. However, multiple peripheral units in the form of local PCs, tape drives, etc. can be interfaced with the Ethernet® cable 202. Additionally, a remote Ethernet® 210 is provided which is interfaced with the Ethernet® 202 via a communication link 212. The communication link 212 is comprised of a modem eliminator 214 that is connected to the Ethernet® 202 via a bridge/router block 216 and to the Ethernet® 210 via a bridge/router block 218. This is a 56 kilobaud system that operates at a significantly lower baud rate than the Ethernet® cables 202 and 210. Therefore, a remote PC 220 is disposed on the remaining Ethernet® 210 and desires to access the server, it must go through the Ethernet® 210, through the communication link 212 at the 56 kilobaud rate to the Ethernet® 202. This is then routed to the server 200 via the FDDI network 204. Therefore, all the systems must share a common bus network with some master on the bus controlling bus contention. However, in a system with the normal operation, once a peripheral unit has seized the bus, it is allowed to maintain contact with the server 200 to transfer the requested data. It should be understood that peripheral units do not control transfer of data to and from the main memory at the server 200; rather, they merely request access to data locations for the purpose of storing information therein or retrieving information therefrom. The entire memory access system function is transparent to the actual peripheral unit. As such, some type of bus master must handle the data traffic to ensure that the data transfer is achieved with no bus contention. Again, this has been a problem that has been addressed many times and is addressed in a manner shown in FIG. 9.

Figure 10:
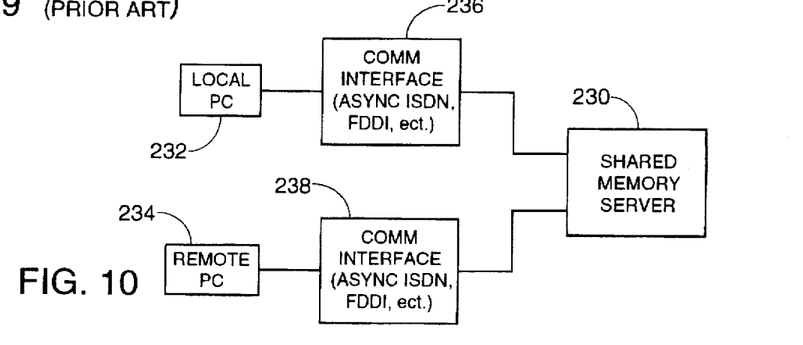
FIG. 10 illustrates the configuration for the system of the present invention.

Referring now to FIG. 10, there is illustrated a diagrammatic view of the differences between a normal system and that of the present system. A shared memory server 230 is provided which is comprised of the shared memory system and the peripheral interface boards 30. There is provided a local PC 232 and a remote PC 234, indicating two separate peripheral units. These two peripheral units are interfaced through a communication interface 236 and 238, respectively,. However, it is noted that they are directly interfaced to the shared memory server 230 as opposed to going through some type of indirect bus interface. This allows them to directly connect to the shared memory server with the arbitration logic 78 in the shared memory server 230 providing the bus contention control and allowing pseudo-concurrence in the data transfer.

Figure 11:
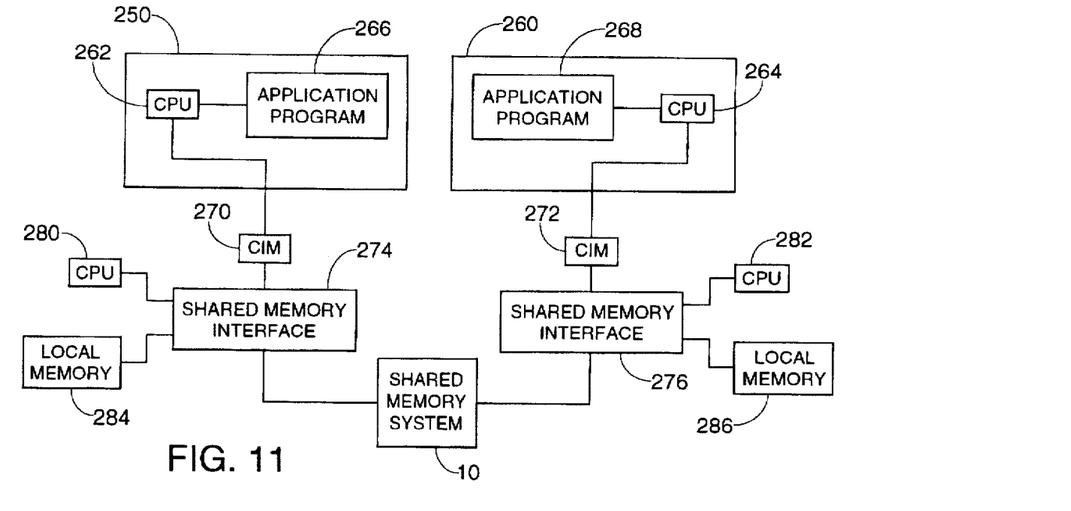
FIG. 11 illustrates an alternate block diagram of the present invention.

Referring now to FIG. 11, there is illustrated an alternate block diagram of the present invention. The shared memory system 10 is illustrated as being connected to two peripheral units 250 and 260. Each of the peripheral units 250 and 260 operate in different modes such that the data transferred to the shared memory system 10 and retrieved from the shared memory system 10 are in a different format. Each of the peripheral units 250 and 260 have a local CPU 262 and 264, respectively, and an application program 266 and 268, respectively. For example, take the situation wherein the CPU 262 is operating a word processing program from one manufacturer in a first format and the CPU 264 in the peripheral unit 260 is operating a word processing program in a second format. Typically, the two formats are not compatible, such that if a file in the first format is imported into the application program portion of the second format, it will not directly read this file correctly. Rather, it must recognize that it is in a different format and run an import program to import the data in that format. This presents a problem in dealing with a shared memory between two separate application programs. If the systems are correctly programmed, the CPUs 262 and 264 could export the data to the shared memory system 10 in a common format. However, the system of the present invention utilizes a proprietary format at the shared memory system 10, such that the data stored in the shared memory system 10 is retrieved and stored in a common format that is not necessarily known to the CPUs 262 and 264 and the peripheral units 250 and 260, respectively. Each of the peripheral units 250 and 260 is interfaced with CIMs 270 and 272, respectively, the CIMs 270 and 272 interface with shared memory interfaces 274 and 276, respectively. CIMs 270 and 272, as described above, are a function of the type of communication link or interface that is required. For example, the CIM 270 could be an Ethernet® adapter with the peripheral unit 250 disposed on an Ethernet® system and the CIM 272 could be an RS232 interface with the peripheral unit 260 connected through the shared memory system 10 via a serial port. The CIM 270 is operable to convert the Ethernet® data to a format compatible with the shared memory interface 274 in the form of a parallel address and parallel data word in a shared memory compatible architecture. Therefore, the CIMs 270 and 272 are merely an interface between the shared memory interfaces 274 and 276, respectively and the respective one of the peripheral units 250 and 260.

The shared memory interfaces 274 each have a local CPU 280 and 282, respectively. They also have local memory 284 and 286, respectively. The CPUs 280 and 282 are provided to allow the shared memory interfaces 274 to provide some distributed processing. For example, in the example described above, the actual conversion of formats is provided at the shared memory interfaces 274 and 276. This would therefore allow the shared memory interfaces 274 to make the determination as to what type of format is received and then convert it to the common format. This is merely a parallel operation to that which could have been performed at the peripheral units. However, now a customer does not have to concern itself with being compatible with the format of the shared memory system 10. In addition, other processes could be performed at the CPU. However, shared memory interfaces 274 and 276 could be configured such that they do nothing more than transfer the addresses and data to the shared memory system 10 and generate the various bus requests interfaced with the arbitration logic 78 that is internal to the shared memory system 10.

When the peripheral unit 250 desires to interface with the shared memory system 10, it merely transmits an address through the CIM 270 which is intercepted by the shared memory interface 274 and then processed. This processing can be in the form of merely translating it to the address space of a shared memory system 10 or further processing the information. Therefore, the peripheral unit 250 merely determines in its own address space where the stored data exists, this being a predetermined location. However, this does not correspond directly to the location in the shared memory system 10, but rather to the translated position, as described above. This therefore provides a completely transparent operation wherein each of the peripheral units 250 and 260 operate independent of each other and merely treat the shared memory system 10 as an extension of their own memory space. The shared memory system then processes the memory accesses on a byte-by-byte basis interleaving the requests such that a byte of information is first transferred between the peripheral unit 250 and the shared memory system 10 and then a byte of information transferred between the peripheral unit 260 and the shared memory system 10. This continues in this interleaved manner under control of the arbitration logic 78.

Figure 12A:
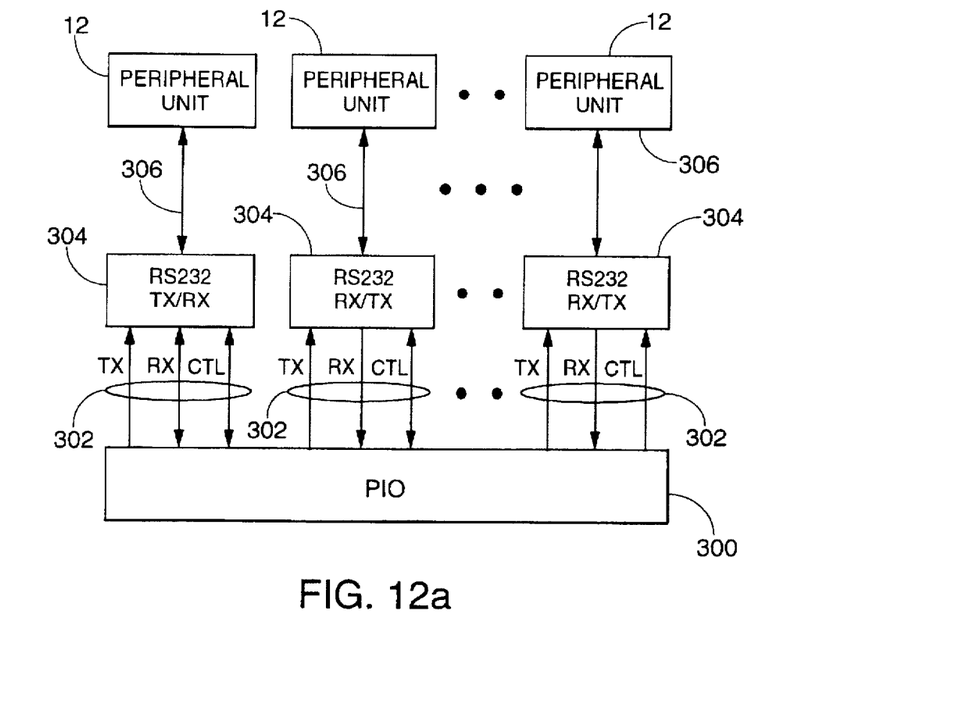
FIGS. 12a and 12b illustrate block diagrams of the Communications Interface Module (CIM) illustrated in FIG. 5.
Figure 12B:
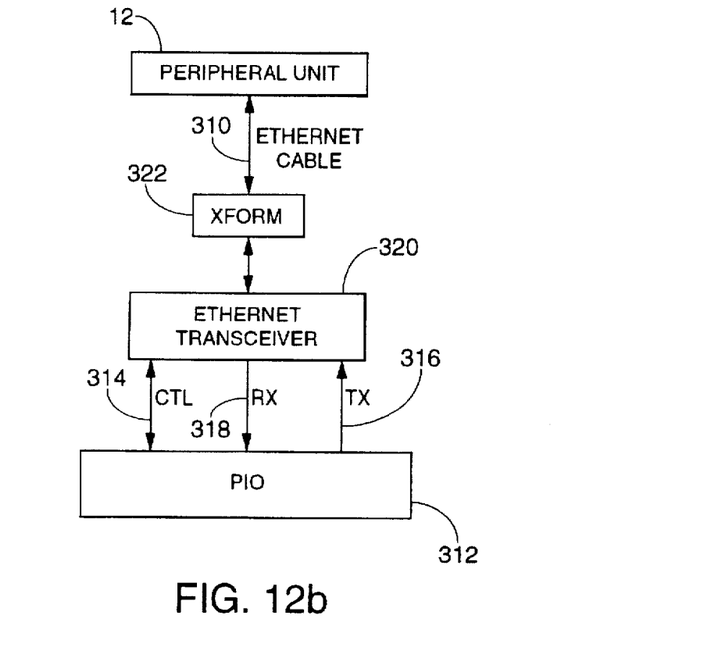

Referring now to FIGS. 12a and 12b, there are illustrated block diagrams of the CIM 48, illustrated in FIG. 5. In general, the CIM 48 provides the "identity" to the system, i.e., what type of system the peripheral 12 is attached to and through which it communicates. The shared memory interface 46 is operable to provide the necessary processing ability to interface between the shared memory system 10 and the CIM 48. As noted above, the CIM 48 can allow the shared memory interface 46 to interface with any type of communication protocol, such as RS232, Ethernet®, etc. In FIG. 12a, there is illustrated a CIM 48 for interfacing with a plurality of peripheral units 12 via an RS232 interface. FIG. 12b illustrates the interface over a single Ethernet® cable.

With specific reference to FIG. 12a, the I/O 100 of FIG. 5 is illustrated as a parallel I/O chip (PIO) 300. In the RS232 mode, the PIO 300 associated with the shared memory interface 46 is operable to deal with multiple RS232 ports. For each RS232 port, a transmit line, receive line and control line are required, there being multiple groups of transmit/receive/control lines 302 output from the PIO 300. Each of the output ports 302 are connected to an RS232 transceiver 304 on the CIM 48. The RS232 transceiver chips are of the type MC145406, manufactured by Motorola. Each of the RS232 transceivers 304 is operable to interface with an RS232 cable 306. Cables 306 then interface with remote peripheral units 12. In operation, it can be seen that the shared memory interface 46 is operable through the PIO 300 to not only select one of the RS232 transceivers 304 for transmittal of data between the peripheral unit 12 and the PIO 300 via an RS232 protocol, but the PIO 300 is also operable to generate the appropriate commands under the control of the CPU 96 on the memory interface 46, as described with respect to FIG. 5.

With specific reference to FIG. 12b, there is illustrated a block diagram of the CIM 48 utilized with an Ethernet® cable 310. An Ethernet® PIO 312 is provided which again assists in giving an identity to the overall memory interface 16, described above with respect to FIG. 1. This PIO 312 is the same PIO as that illustrated in FIG. 12a with reference to the PIO 300. The only difference is that a different program is implemented in the shared memory interface 46, this program giving the "identity" to the overall shared memory interface 46. As noted above with respect to FIG. 3b, the CIM 48 is a separate board that is plugged into the actual board that supports the circuitry for the shared memory interface 46. This allows the same shared memory interface board 46 to be utilized for different "identities" of the communication interface module 48. In the example of FIG. 12b, this identity is that of an Ethernet®. The Ethernet® protocol requires a set of control lines 314, transmit lines 316 and receive lines 318. These are input to an Ethernet® transceiver chip 320, which is a highly integrated chip which is conventionally available from companies such as Motorola. The output of the Ethernet® transceiver chip 320 is connected through a transformer 322 to the Ethernet® cable 310. The Ethernet® transceiver 320 is a conventional chip and the operation thereof is well known.

In summary, there has been provided a shared memory system that includes a centrally located shared memory that has a global shared memory bus associated therewith. The shared memory associated therewith is connected through shared memory interfaces to different peripheral units via various communication links. The shared memory interfaces are operable to interface with arbitration logic in the shared memory system, which arbitration logic is operable to determine the time that each peripheral unit is allocated for transfer of data to and from the shared memory system. The arbitration logic controls the system to allow a single byte of data to be transferred to each unit on a byte-by-byte basis such that each peripheral unit is only allowed access to the bus for a single byte of information, after which it relinquishes the bus to the next requesting one of the peripheral units. This continues until all data has been transferred.

Although the preferred embodiment has been described in detail, it should be understood that various changes, substitutions and alterations can be made therein without departing from the spirit and scope of the invention as defined by the appended claims.

What is claimed is:

1. A virtual media system, comprising:

a shared memory system having a plurality of storage locations, each storing data of a finite data size as a block of data that is accessible by an address, and when addressed, for storage of data therein or retrieval of data therefrom;

a memory access device for controlling access to said shared memory system;

a plurality of peripheral devices for accessing said shared memory system and generating addresses for addressing a memory location and transferring data thereto or retrieving data therefrom each of said peripheral devices having a memory space;

a plurality of memory interface devices, each associated with one of said peripheral devices and, each of said memory interface devices operable to interface between the one of said peripheral devices associated therewith and said shared memory system, each of said memory interface devices operable to receive said addresses for transfer to said shared memory system; and an arbitration device associated with said shared memory system and said memory access device, said arbitration device for determining which of said peripheral devices is allowed to access said shared memory system through its associated one of said memory interface devices and operating on a block-by-block basis to allow each of said peripheral devices to only access said shared memory system for at least a block of data before relinquishing access thereto in response to a request from another one of said peripheral devices wherein all requesting ones of said memory interface devices will have uninterrupted access to a complete block of data prior to any of said memory interface devices having access to the next block of data;

said shared memory system having an address space that is different from the memory space of said peripheral devices and wherein each of said memory interface devices is operable to map the memory space of said associated peripheral device to the memory space of said shared memory system;

wherein each of said memory interface devices operates on a predetermined communication protocol between each of said memory interface devices and the associated one of said peripheral devices and wherein each of said memory interface devices has a communication interface module for effecting an interface between said associated peripheral device and the associated one of said memory interface device in accordance with said communication protocol; and wherein each of said memory interface devices is afforded a predetermined priority and said arbitration device is operable to control access to said shared memory system in a second mode that is not on block-by-block basis, said second mode of operation operable to allow the highest priority one of said peripheral devices requesting access to said shared memory system to seize and maintain access to said shared memory system until all data access required thereby is complete and the access relinquished.

2. The virtual memory system of claim 1, wherein said block of data is a byte of data.

3. The shared memory system of claim 1, wherein each of said memory interface devices includes a central processing unit for providing processing capacity and a local memory, said local memory in each of said memory interface devices having a memory address space that is directly mapped to the memory space of said peripheral device associated with the respective associated one of said memory interface devices.

* * * * *